(12) United States Patent
Yen et al.

(10) Patent No.: US 7,979,219 B2
(45) Date of Patent: *Jul. 12, 2011

(54) TRANSMISSION MEDIUM TESTING APPARATUS AND METHOD

(75) Inventors: Kuang-Yu Yen, Hsinchu (TW); Meng-Han Hsieh, Hsinchu (TW); Hou-Wei Lin, Hsinchu (TW); Chi-Shun Weng, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/488,915

(22) Filed: Jun. 22, 2009

(65) Prior Publication Data

US 2009/0259422 A1    Oct. 15, 2009

Related U.S. Application Data

(63) Continuation of application No. 11/058,232, filed on Feb. 16, 2005, now Pat. No. 7,561,980.

(30) Foreign Application Priority Data

Feb. 20, 2004   (TW) ............................. 93104387 A

(51) Int. Cl.
  *G01R 27/00*   (2006.01)
  *G01R 13/00*   (2006.01)
(52) U.S. Cl. ............ 702/58; 702/57; 702/79; 702/108; 702/117; 702/159; 702/182; 702/184; 702/189; 702/190; 370/242; 370/248; 324/533; 324/534

(58) Field of Classification Search .................... 702/57, 702/58, 79, 108, 117, 159, 182, 184, 189, 702/190; 370/242, 248; 324/533, 534
See application file for complete search history.

(56) References Cited

U.S. PATENT DOCUMENTS

| 6,252,904 | B1 | 6/2001 | Agazzi et al. |
| 6,697,768 | B2 * | 2/2004 | Jones et al. .................... 702/189 |
| 6,833,859 | B1 | 12/2004 | Schneider et al. |
| 7,561,980 | B2 * | 7/2009 | Yen et al. ....................... 702/117 |
| 2004/0001450 | A1 | 1/2004 | He et al. |

OTHER PUBLICATIONS http://www.everything2.net/e2node/inner%2520product.
http://everything2.net/enode2/Product%2520of%2520Sums.
Simon Haykin; "Communication System (3rd. ed. 1996)," published by John Wiley & Sons, Inc., pp. 578-589.

* cited by examiner

*Primary Examiner* — Sujoy K Kundu
(74) *Attorney, Agent, or Firm* — Thomas, Kayden, Horstemeyer & Risley, LLP

(57) ABSTRACT

The invention provides a method for testing a transmission medium used in a full-duplex communication system comprising an endpoint that comprises a transmitting end (TX) and a receiving end (RX); the method comprises the steps of: first, transmitting a transmitted signal which comprises a test signal sequence with a high auto-correlation characteristic; then, receiving a received signal, and performing a correlation operation on the test signal and the received signal; finally, according to the result of the correlation operation, determining the impedance matching condition of the transmission medium.

17 Claims, 3 Drawing Sheets

TRANSMISSION MEDIUM TESTING APPARATUS AND METHOD

CROSS REFERENCED APPLICATIONS

This application is a continuation of U.S. application Ser. No. 11/058,232, filed on Feb. 16, 2005, now U.S. Pat. No. 7,561,980, which is incorporated herein by reference.

BACKGROUND OF THE INVENTION

1. Field of the Invention

The present invention relates to a communication system, especially to a transmission medium testing apparatus and method applying to a communication system.

2. Description of the Prior Art

In communication system, a transmission medium is used to transmit signals from one endpoint to a remote endpoint. The condition of the transmission medium, such as the length of the cable, whether a short circuit, an open circuit, or an impedance-mismatching point in the cable, all significantly influences the quality of the transmitted signal. Therefore, transmission medium testing apparatuses and methods are used to detect the condition of the transmission medium in the communication system.

Please refer to FIG. 1A, FIG. 1B, and FIG. 1C; FIG. 1A to 1C show the schematic diagrams of the cable testing method in the prior art. The method for testing a cable in the prior art is to transmit a pulse wave from endpoint A; if the cable is in good condition, the pulse wave/transmitting wave will be transmitted from endpoint A to endpoint B, as shown in FIG. 1A. If the cable has an impedance-mismatching point C, such as short circuit or open circuit, the pulse wave/transmitting wave produces a reflected wave from endpoint C back to endpoint A, as shown in FIG. 1B. The time spent by the detected reflected wave to reach endpoint A depends on the location of the impedance-mismatching point C, and the impedance mismatching condition of the impedance-mismatching point C depends on the characteristics of the reflected wave (such as: the phase). Therefore, the method for testing a cable in the prior art is to transmit a signal from endpoint A, and the time spent by the detected reflected wave to reach endpoint A and the dimension of the reflected wave are used to determine the location and the condition of the impedance-mismatching point on the cable.

The cable testing method in the prior art described above can only be applied in a half-duplex communication system. If a full-duplex network system is used, such as 1000 Mbps Ethernet, when endpoint A transmits a pulse wave, the endpoint B also transmits a signal to endpoint A. Therefore, while cable testing is being performed, the endpoint A will receive both the reflected wave caused by the impedance-mismatching point C and the transmitting wave transmitted from endpoint B, as shown in FIG. 1C. Furthermore, when the transmitting end (Tx) of the full-duplex network system transmits signals, the transmitted signal will generate an echo effect at the receiving end (Rx). Therefore, the full-duplex network system cannot determine the location and the condition of the impedance-mismatching point on the cable from the signal received at endpoint A. Consequently, the method using the reflected wave to test cable in the prior art cannot be used in the full-duplex network system, meaning the application of the prior art is limited.

Therefore, the main objective of the present invention is to provide a transmission medium testing apparatus and method to solve the problems described above.

SUMMARY OF THE INVENTION

The main objective of the present invention is to provide a transmission medium testing apparatus and method used in a communication system to solve the problem of the prior art.

According to the objective described above, the present invention provides a method for testing a transmission medium in a communication system which comprises an endpoint, wherein the endpoint comprises a transmitting end (TX) and a receiving end (RX). A transmitted signal comprising a test signal sequence with high auto-correlation is first transmitted. Then a received signal is received and a correlation operation is performed on the transmitted signal and the received signal. The impedance matching condition of the transmission medium is determined according to the result of the correlation operation at last.

According to the objection described above, this invention provides an apparatus for testing a transmission medium used in a communication system which comprises an endpoint coupled to the transmission medium; the endpoint comprises a transmitting end (TX) for transmitting a transmitted signal and a receiving end (RX) for receiving a received signal. The apparatus comprises a test-signal-sequence-transmitting circuit, a correlation operation circuit, and an impedance-matching determining circuit. The test-signal-sequence-transmitting circuit is disposed at the transmitting end for transmitting a test signal sequence with high auto-correlation to the transmission medium. The correlation operation circuit is disposed at the receiving end for performing a correlation operation on the received signal and the test signal sequence. The impedance-matching determining circuit determines the impedance matching condition of the transmission medium according to the result of the correlation operation.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1A:
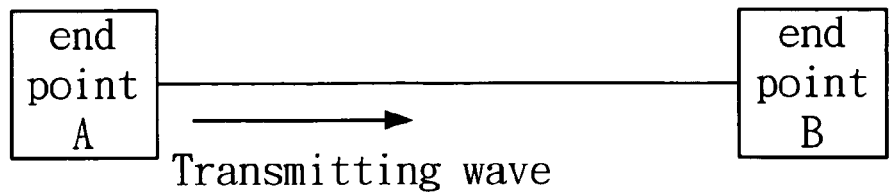
FIG. 1A to 1C show the schematic diagrams of the cable testing method in the prior art.
Figure 1B:
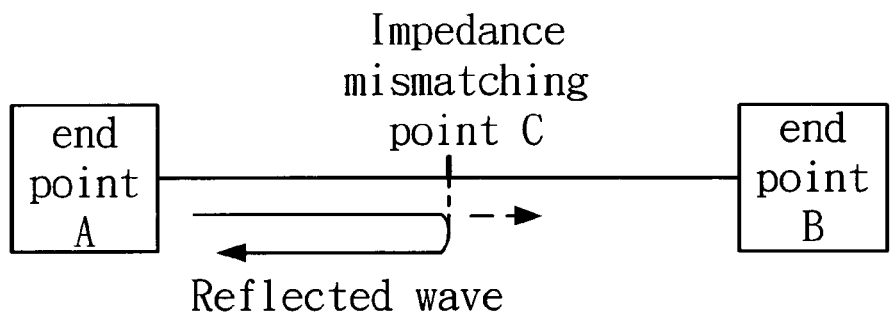
Figure 1C:
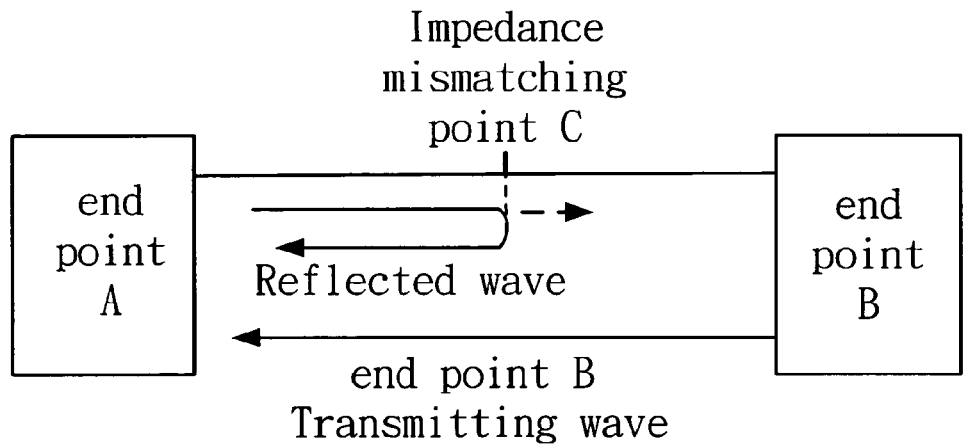
Figure 2:
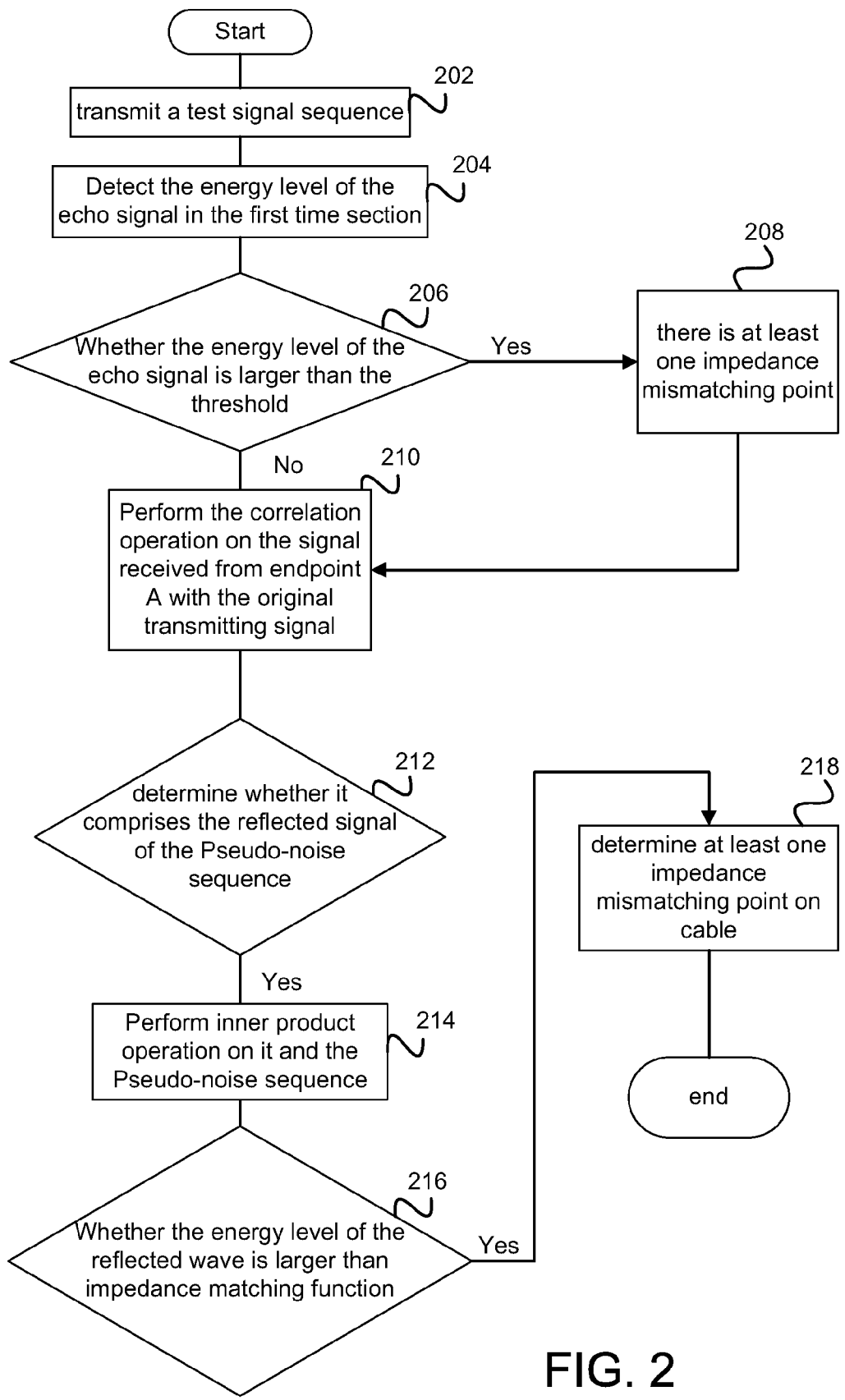
FIG. 2 shows the flow chart of an embodiment of the transmission medium testing method for a communication system.

Please refer to FIG. 2, which shows the flow chart of an embodiment of the transmission medium testing method for a communication system. First step 202 is performed to transmit a test signal sequence which compiles a plurality of signals from endpoint A, wherein the test signal sequence has a high auto-correlation characteristic. In other words, when a correlation operation is performed on the test signal sequence and other signal sequences, such as when performing a inner product operation, the result is obviously different from the result of performing a correlation operation on the test signal sequence and itself. Besides, if the correlation operation is performed on two different test signal sequences, the phase difference of the two test signal sequences will affect the result of the operation.

In this embodiment, the test signal sequence is a Pseudo-noise sequence with a period of $2^n-1$ (i.e. comprising 2.sup.n−1 signals). When the inner product operation is performed on the Pseudo-noise sequence and other test signal sequences, the result is obviously different from the result of performing the inner product operation on two Pseudo-noise sequences.

Besides, if there is a phase difference between the two Pseudo-noise sequences, the result of performing the inner product operation is a first constant (e.g. −1), but if two Pseudo-noise sequences with no phase difference are used, the result of the inner product operation is a second constant (e.g. 2.sup.n−1), which is obviously different from the first constant. For the description of the auto-correlation of the related characteristics, correlation operations, and Pseudo-noise sequences mentioned above, please refer to Simon Haykin, "Communication System (3.sup.rd. ed. 1996)" published by John Wiley & Sons, Inc., pp. 578-589.

Then, step 204 is performed, in which the energy level of the echo signal in the first time section is detected. Taking the 1000 Mbps Ethernet as an example, which is a full-duplex communication system, both the transmitting end (TX) and the receiving end (RX) employ the same pair of cable for transmitting/receiving signal. In a very short time after the transmitting end transmits the signal, the receiving end also receives an echo signal caused by the transmitted signal itself. Therefore, when there is an impedance-mismatching point very close to the endpoint A of the cable, the receiving end receives a mixture of the echo signal and the reflected signal of the transmitting signal. In this embodiment, detect the energy level of the echo signal within the first time section after the transmitting end transmits the test signal sequence.

If the energy level of the echo signal is larger than a threshold (Step 206), it shows that the signal received at the receiving end is not only the echo signal, but also the reflected signal of the transmitting signal.

Therefore, step 208 is performed to confirm that there is at least one impedance-mismatching point located very close to endpoint A on the cable. The method for detecting the energy level of a signal by using circuits is well understood by people skilled in this art. For example, an adder or an integrator can both be employed for detecting the energy level of the echo signal. Then, a comparator is employed to compare the energy level with the threshold, and the steps mentioned above can be performed; however, this invention is not limited to this. Furthermore, another method to perform this step is to process the echo cancellation by the echo cancellation circuit disposed at the receiving end and then to detect the echo residual. When the echo residual is larger than the threshold, it shows that the echo signal comprises the reflected signal.

Next, step 210 is performed. By the end of the first time section, the reflected wave of the test signal sequence and the echo effect can be discriminated clearly. At this time, the correlation operation is performed on the signal received at endpoint A with the original transmitted signal. From the previous description, it is already known that in the full-duplex communication system, the signal received at the receiving end is a mixture of the reflected signal of the transmitting signal and the transmitting signal transmitted from a distant endpoint. Furthermore, the Pseudo-noise sequence employed in this invention has the high auto-correlation characteristic as in the above description.

Therefore, according to the result of performing the correlation operation on the signal received at endpoint A and the original transmitted signal, the signal received at endpoint A can be determined whether it is a pure transmitted signal transmitted from the endpoint from a long distance, or it comprises the reflected signal of the Pseudo-noise sequence (step 212).

The correlation operation method of this embodiment sequentially adjusts the phase of the received signal at endpoint A, and then performs the inner product operation on the received signal and the Pseudo-noise sequence (step 214).

In the above description, when the received signal comprises the reflected wave of the transmitted signal, adjust the phase of the received signal to eliminate the phase difference between the reflected wave of the transmitted signal included in the received signal and the Pseudo-noise sequence transmitted for the Pseudo-noise sequence has high auto-correlation. There is obvious difference between the result of the inner product operation and of other conditions (for example, there is no reflected wave of the transmitted signal in the received signal, or there is phase difference between the reflected wave of the transmitted signal and the Pseudo-noise sequence). In a preferred embodiment, by sequentially adjusting the phase of the received signal at endpoint A and performing inner product operation on the Pseudo-noise sequence and according to the result of the inner product operation, several conditions can be known: 1. Whether the received signal of the endpoint A has the reflected wave of the transmitted signal. 2. If yes, what the dimension of the phase difference between the reflected wave of the transmitted signal and Pseudo-noise sequence is.

To test a transmission medium by using the test signal sequence with high auto-correlation, such as a Pseudo-noise sequence, whether a received signal comprises a reflected wave of a transmitted signal can be determined by performing correlation operation on the received signal and the transmitted signal. Therefore, this invention can be applied to a communication system, such as 1000 Mbps Ethernet, but not limited to that at the same time.

In addition, under the condition that the transmitting velocity (V) of the signal on the cable is already known, the time difference (T) between the endpoint A sending the signal to the cable and the endpoint A receiving the reflected waves of the transmitted signal can be detected, and the position of the impedance-mismatching point on the cable can then be determined (V.times.T/2). However, the above method is too simplified for that practical communication system and the result of tests can be affected by many non-ideal situations. To test a transmission medium, ex: cable, by using the test signal sequence with high auto-correlation, such as a Pseudo-noise sequence, the phase of the received signal can then be adjusted and the correlation operation can be performed on the adjusted signal and the original transmitted signal, thus the phase difference (p) between the original transmitted signal and the reflected wave of the transmitted signal can be obtained. Because the transmitting time of each symbol of the transmitted testing signal sequence is a constant (t) and the transmitting velocity (V) of the signal on the cable is known, the position of the impedance-mismatching point on the cable can be more precisely determined (V.times.p.times.t/2).

Step 216 is performed then. In practical network, the impedance of each location is different from the ideal value. Accordingly, an impedance matching function is set to express the level of tolerance of the impedance mismatch in practical network. When the signal is transmitted on the cable, the impedance matching function is determined by the reflective coefficient (.GAMMA.), of which its value is related to the difference between difference between the real value of the impedance-mismatching point (Zp) and the ideal impedance (Zi). The relation is shown as following formula:

$$1 = Zp - Zi \; Zp + Zi$$

Therefore, according to the impedance mismatch in the communication system, which is the tolerance of the difference between the practical impedance value and the ideal impedance value, the threshold value of the impedance matching function is determined. When the signal is transmitted on the cable, the signal attenuates with the increasing distance of the transmission. Therefore, when the impedance matching function corresponding to each endpoint on the cable is being determined, the propagation distance of signals transmitted from endpoint A to each endpoint of the cable and the signal attenuation degree also need to be taken into consideration. Generally speaking, the signal attenuation degree of the transmitted signal is an exponential function of the propagation distance ($\exp(-\alpha \times L)$, wherein $\alpha$ is an attenuation constant and L is the propagation distance). Therefore, for each endpoint on the cable, the impedance matching function is not a constant but a function value which relates to the propagation distance. In this embodiment, the function is an exponential function.

Since the reflected wave and the transmitted signal may be in-phase or phase-inverse, the impedance matching function comprises in-phase and phase-inverse. When step 216 is performed, and endpoint A detects the receiving of the reflected wave of the transmitting signal, the position of the impedance-mismatching point corresponding to the reflected wave is first determined according to the method of the embodiment described above.

Then, the energy level of the reflected wave is calculated and is then compared with the impedance matching function corresponding to the location of the impedance-mismatching point. The comparison helps to judge whether the impedance mismatching degree of the impedance-mismatching point of the cable is larger than the level of tolerance of the communication system.

If it is larger than the level of tolerance of the communication system, step 218 is performed to determine whether there is at least one impedance-mismatching point on the cable. With the method of calculation described above, the location of the impedance-mismatching point on the cable is determined. The theory and the method to detect and calculate the energy of the reflected wave is the same as the theory and method mentioned before. Please refer to the description above, and it will not be described in detail again here.

Figure 3:
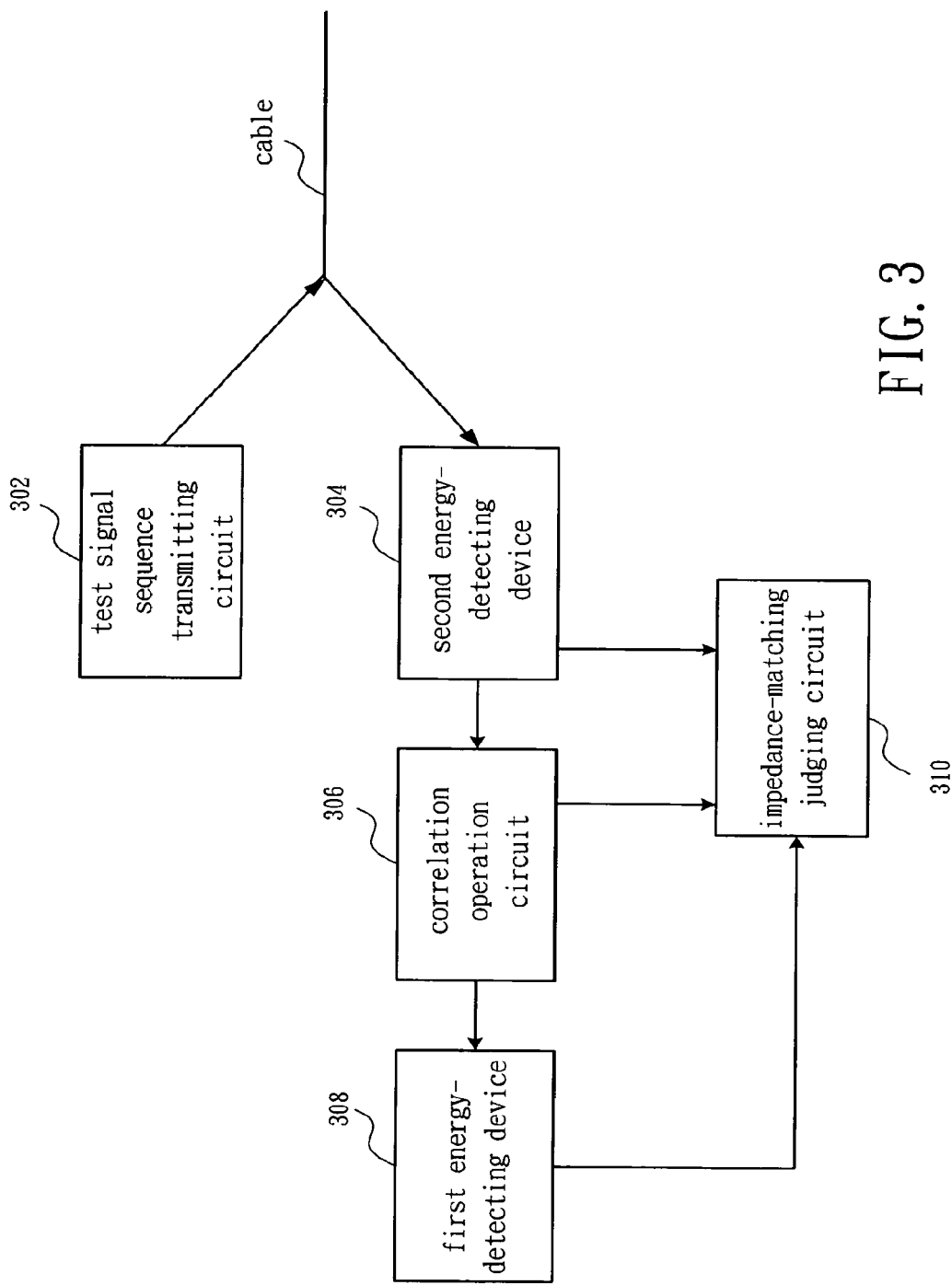
FIG. 3 shows the block diagram of an embodiment of the transmission medium testing apparatus for a communication system.

FIG. 3 shows the block diagram of an embodiment of the transmission medium testing apparatus for a communication system. In FIG. 3, test-signal-sequence-transmitting circuit 302 is used for sending out a test signal sequence with high auto-correlation to the transmission medium. The second energy-detecting device 304 is used for detecting the energy level of an echo signal corresponding to a transmitted signal in the first time period. The correlation operation circuit 306 is used for performing a correlation operation on the received signal and the test signal sequence in the second time period, and a first energy-detecting device 308 is used for detecting the energy level of the reflected signal. The impedance-matching-determining circuit 310 is used for judging whether there is at least one impedance matching point within a short distance on the cable according to the test result of the second energy-detecting device 304; it is also used for judging, according to the result of the correlation operation of the correlation operation circuit 306, whether the received signal includes the reflected wave of the transmitted signal and for determining the location of the impedance-mismatching point corresponding to the reflected wave. Furthermore, according to the detecting result of the first energy-detecting device 308, the impedance-matching-determining circuit 310 judges whether the impedance mismatching condition of the impedance-mismatching point can be tolerated by the communication system. It is necessary to notice that the transmission medium testing apparatus for a communication system shown in FIG. 3 is only one embodiment of the testing method described above, and this invention is not limited to this embodiment.

The cable described above is not limited to various kinds of cables in the prior art. Any transmission medium used in a communication system and transmitting/receiving signals between endpoints, such as twisted wire pairs, can adapt the present invention for testing. Moreover, the method described above cannot only test impedance-mismatching points but also the length of the cable. Persons skilled in the art can easily put the method into practice according to the description above, and details will not be described again here.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method for testing a transmission medium used in a communication system comprising an endpoint which comprises a transmitting end (TX) and a receiving end (RX), the method comprising:
   transmitting, by a transmission medium testing apparatus, a transmitted signal comprising a test signal sequence;
   receiving a received signal and performing a correlation operation on the test signal sequence and the received signal;
   determining an impedance matching function corresponding to a function value of an impedance-mismatching position; and
   comparing a detected energy level of a reflected signal of the transmitted signal with a value of the impedance matching function to determine whether a corresponding position is an impedance-mismatching point.

2. The method of claim 1, wherein the test signal sequence is a pseudo-noise sequence.

3. The method of claim 1, wherein the received signal comprises a reflected signal of the transmitted signal, the result of the correlation operation relates to a phase difference between the reflected signal and the transmitted signal.

4. The method of claim 3, wherein the correlation operation is an inner product operation.

5. The method of claim 3, wherein the correlation operation is performed by adjusting the phase of the received signal and performing an inner product operation on the adjusted received signal and the transmitted signal.

6. The method of claim 3, wherein the condition of the transmission medium is determined according to the phase difference between the reflected signal and the transmitted signal.

7. The method of claim 1, wherein the test signal sequence comprises a plurality of symbols, each of which is transmitted in a certain transmission velocity, and a time interval exists between the transmission time of adjacent symbols; the position of at least one impedance-mismatching point on the transmission medium can be determined according to the transmission signal, the transmission time, and the phase difference between the reflected signal and the transmitted signal.

8. The method of claim 1, wherein the impedance matching function is determined according to a reflective coefficient, a signal attenuation degree, and a signal propagation distance, and the signal propagation distance is the distance between the endpoint and the position.

9. The method of claim 8, wherein the impedance matching function is an exponential function of the signal propagation distance.

10. The method of claim 1, further comprising operations of:
   detecting the energy level of an echo signal corresponding to the transmitted signal; and
   determining the matching condition of the impedance of the transmission medium according to the result of detection of the energy level of the echo signal.

11. The method of claim 10, wherein the operation of determining the condition of the impedance of the transmission medium comprising:
   comparing the result of the detection of the energy level of the echo signal with a threshold; and
   if the result of the detection of the energy level of the echo signal is larger than the threshold, determining that the transmission medium thereon has at least one impedance-mismatching point in a short distance apart from the endpoint.

12. An apparatus for testing a transmission medium used in a communication system comprising an endpoint coupled to the transmission medium, the endpoint comprising a transmitting end (TX) for transmitting a transmitted signal and a receiving end (RX) for receiving a received signal, the apparatus comprising:
   a test signal generator, disposed at the TX, for generating a test signal to the transmission medium;
   a correlation operating circuit, disposed at the RX, for performing a correlation operation on the received signal and the test signal;
   a decision circuit for determining the condition of the transmission medium according to the result of the correlation operation;
   first energy-detecting circuit for detecting an energy level of a reflected signal of the transmitted signal; and
   a circuit for comparing a detected energy level of a reflected signal of the transmitted signal with a value of an impedance matching function to determine whether a corresponding position on the transmission medium is an impedance-mismatching point.

13. The apparatus of claim 12, wherein the decision circuit determines a position of at least one impedance-mismatching point on the transmission medium according to the phase difference between a reflected signal corresponding to the test signal and the transmitted signal.

14. The apparatus of claim 12, wherein the received signal comprises a reflected signal of the transmitted signal.

15. The apparatus of claim 12, further comprising a second energy-detecting circuit for detecting the energy level of an echo signal corresponding to the transmitted signal.

16. The apparatus of claim 12, wherein the test signal is a pseudo-noise sequence.

17. A method for testing a transmission medium used in a communication system comprising an endpoint which comprises a transmitting end (TX) and a receiving end (RX), the method comprising:
   transmitting, by a transmission medium testing apparatus, a transmitted signal comprising a test signal sequence with high auto-correlation;
   receiving a received signal and performing a correlation operation on the test signal sequence and the received signal;
   determining an impedance matching condition of the transmission medium by comparing a detected energy level of a reflected signal of the transmitted signal with a value of an impedance matching function to determine whether a position is an impedance-mismatching point.

* * * * *